(12) United States Patent
Yoshida et al.

(10) Patent No.: US 9,770,742 B2
(45) Date of Patent: Sep. 26, 2017

(54) METHOD FOR DECONTAMINATING SOIL AND THE LIKE AND SYSTEM FOR DECONTAMINATING SOIL AND THE LIKE

(71) Applicants: Hideo Yoshida, Tokorozawa-shi, Saitama (JP); MORITA MIYATA CORPORATION, Minato-ku, Tokyo (JP)

(72) Inventors: Hideo Yoshida, Tokorozawa (JP); Yasuhiro Suyama, Higashimurayama (JP)

(73) Assignees: Hideo Yoshida, Saitama (JP); Morita Miyata Corporation, Tokyo (JP)

( * ) Notice: Subject to any disclaimer, the term of this patent is extended or adjusted under 35 U.S.C. 154(b) by 0 days.

(21) Appl. No.: 14/422,946

(22) PCT Filed: Jun. 18, 2013

(86) PCT No.: PCT/JP2013/003786
§ 371 (c)(1),
(2) Date: Feb. 20, 2015

(87) PCT Pub. No.: WO2014/030282
PCT Pub. Date: Feb. 27, 2014

(65) Prior Publication Data
US 2015/0306644 A1     Oct. 29, 2015

(30) Foreign Application Priority Data
Aug. 22, 2012   (JP) .................................. 2012-183646

(51) Int. Cl.
*B09C 1/08*     (2006.01)
*B01D 11/02*    (2006.01)
(Continued)

(52) U.S. Cl.
CPC ................ *B09C 1/08* (2013.01); *B01D 11/02* (2013.01); *B01D 11/0284* (2013.01);
(Continued)

(58) Field of Classification Search
None
See application file for complete search history.

(56) References Cited

U.S. PATENT DOCUMENTS 4,874,485 A * 10/1989 Steele .................... C02F 1/4672
                                                          205/688
5,640,701 A *  6/1997 Grant ........................ B09C 1/02
                                                          209/2
(Continued)

FOREIGN PATENT DOCUMENTS

JP          71025614      *  6/1967
JP           5-192648        8/1993
(Continued)

*Primary Examiner* — Melvin C Mayes
*Assistant Examiner* — Sheng H Davis
(74) *Attorney, Agent, or Firm* — Norris McLaughlin & Marcus, P.A.

(57) ABSTRACT

An object to be decontaminated contaminated with radioactive material is introduced into an acid eluting solvent to dissolve the radioactive material. The radioactive material dissolved is concentrated and separated from the eluting solvent in the present method. The object to be decontaminated comprises contaminated soil and contaminated liquid. One or both of the contaminated soil and the contaminated liquid are collected and introduced into the eluting solvent. The radioactive materials and the object to be decontaminated dissolved in the eluting solvent are separated into solid and liquid. The decontaminated soil separated from the eluting solvent is collected. The eluting solvent used for separating the radioactive material and in which radioactive material is dissolved is concentrated.

8 Claims, 8 Drawing Sheets

Field

Paddy Field, Wetlands

(51) Int. Cl.

| | |
|---|---|
| *G21F 9/08* | (2006.01) |
| *G21F 9/28* | (2006.01) |
| *G21F 9/00* | (2006.01) |
| *G21F 9/06* | (2006.01) |
| *G21F 9/30* | (2006.01) |

(52) U.S. Cl.
CPC .......... *B01D 11/0288* (2013.01); *G21F 9/001* (2013.01); *G21F 9/06* (2013.01); *G21F 9/08* (2013.01); *G21F 9/28* (2013.01); *G21F 9/30* (2013.01)

(56) References Cited

U.S. PATENT DOCUMENTS

| | | | | |
|---|---|---|---|---|
| 5,832,393 | A * | 11/1998 | Omata | G21F 9/06 |
| | | | | 205/750 |
| 6,649,055 | B1 * | 11/2003 | Whitton | F04D 7/08 |
| | | | | 137/343 |
| 7,384,529 | B1 * | 6/2008 | Ekechukwu | G21F 9/28 |
| | | | | 205/43 |
| 2010/0181084 | A1 * | 7/2010 | Carmo | A62D 1/0035 |
| | | | | 169/45 |
| 2010/0185036 | A1 * | 7/2010 | Morimoto | C02F 1/4693 |
| | | | | 588/20 |

FOREIGN PATENT DOCUMENTS

| | | | |
|---|---|---|---|
| JP | 10-213697 | | 8/1998 |
| JP | 4970627 | | 4/2012 |
| JP | 3176996 | | 6/2012 |
| WO | 2009257828 | * | 7/2010 |
| WO | 2012165027 | * | 12/2012 |

* cited by examiner

Procedure of Decontamination Work for Soil of the Present Invention

Fig. 4(a)(I) Field

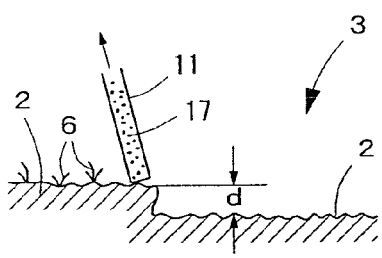

Fig. 4(a)(II) Paddy Field, Wetlands

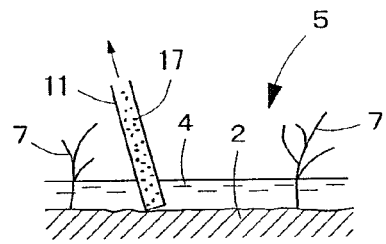

Fig. 4(b) Dissolve Radioactive Cesium into Carbonated Water and Stir

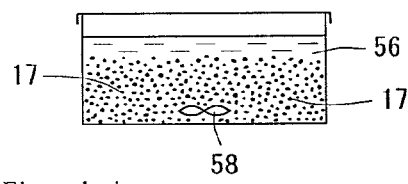

Fig. 4(c) Solid-Liquid Separation of Soil to be Decontaminated and Contaminated Water

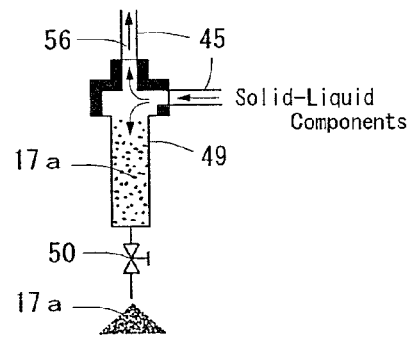

Fig. 4(d) Electrolysis (Adsorption of Radioactive Cesium)

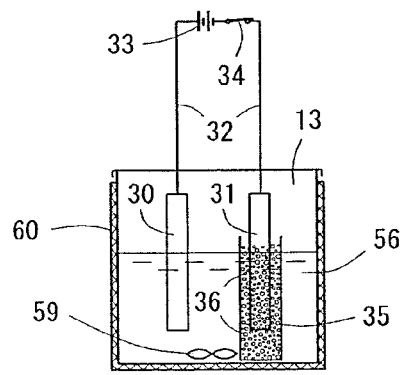

Fig. 4(e) Reutilize Carbonated Water in Electrolysis Tank (Move to Separation Tank), Safe Storage of Cesium-Adsorbed Adsorbent

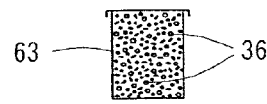

Fig. 4(f) Add Soil Activator

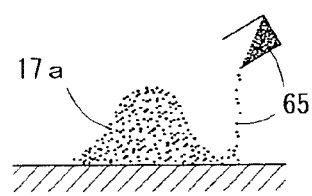

Fig. 4(g) Return Decontaminated Soil and Improved Soil to the Original Position

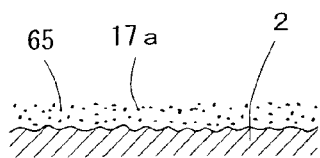

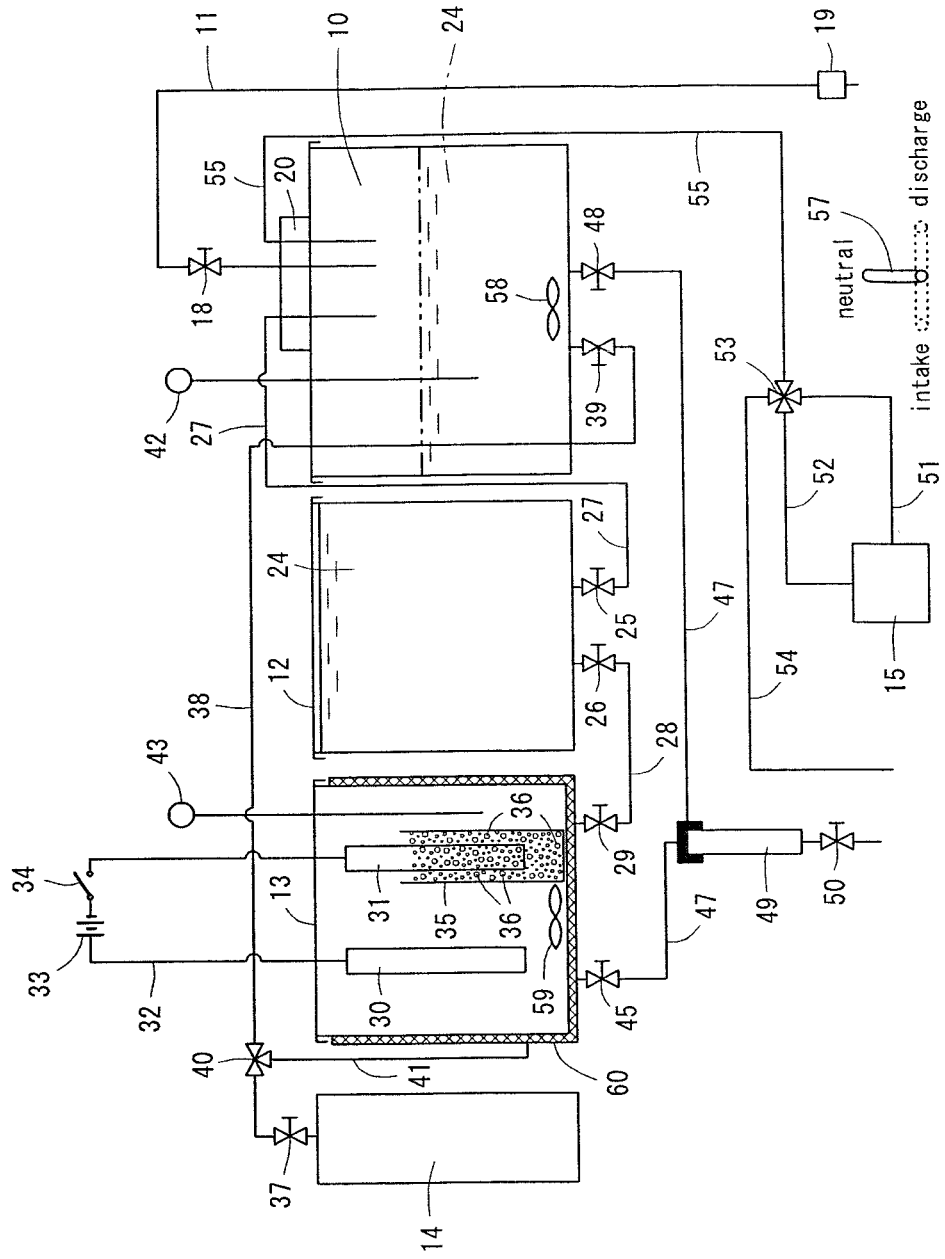
Fig. 5  Before Introduction of Contaminated Soil and Before Separation of Cesium

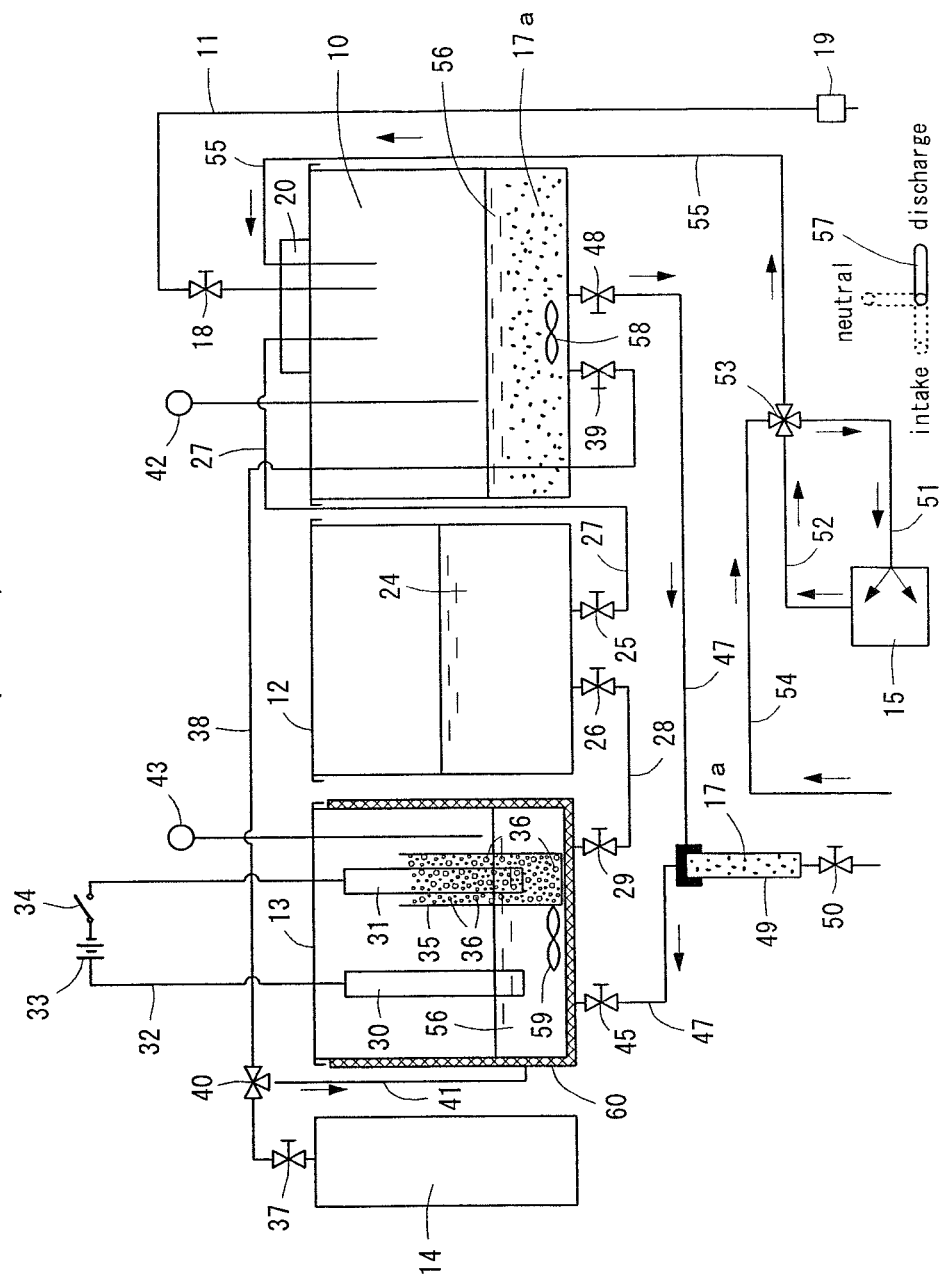
Fig. 7  After Separation of Cesium, Move Carbonated Water and Soil to be Decontaminated to Concentration Tank for Solid-Liquid Separation

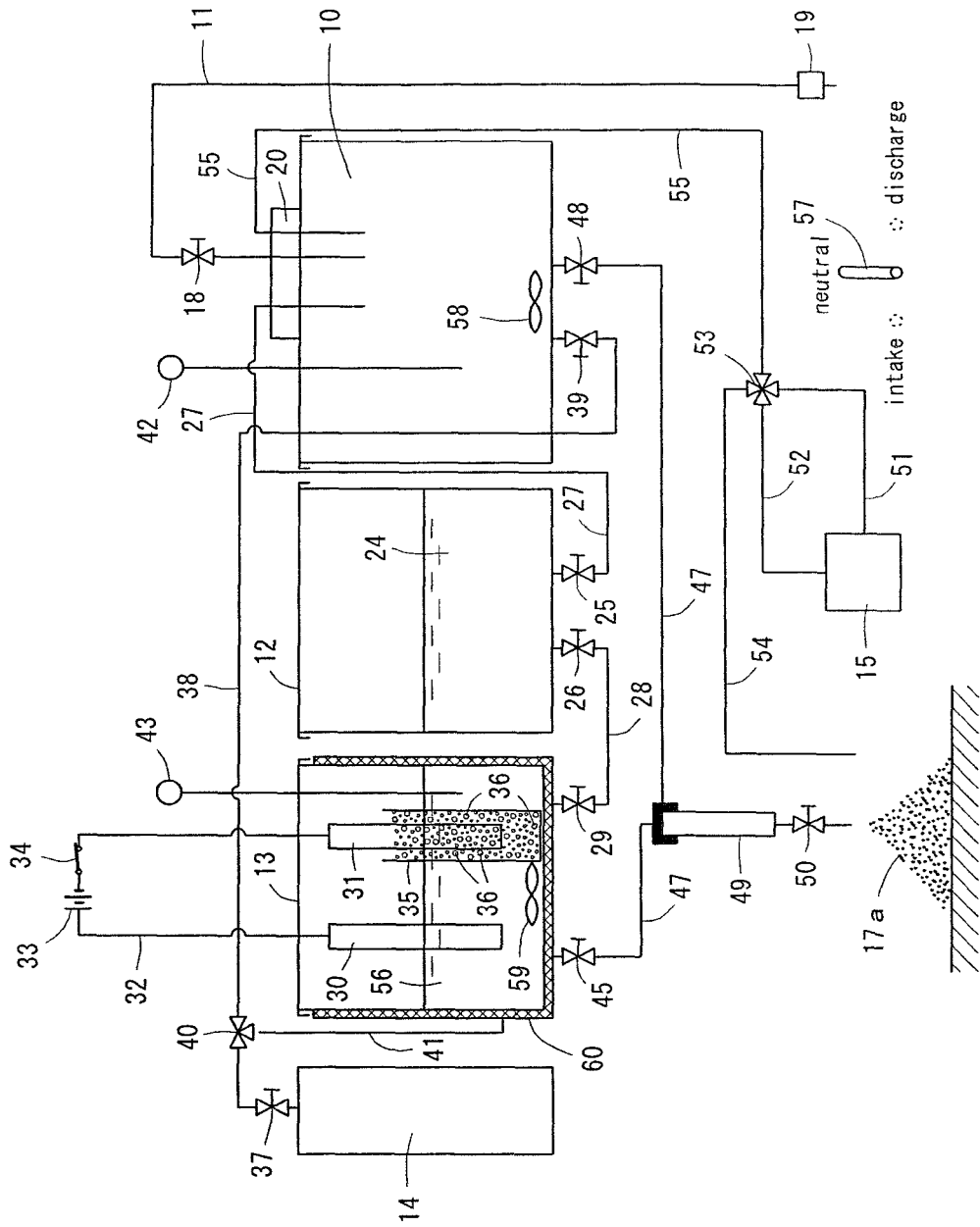
Fig. 8  Concentrate Cesium in Concentration Tank and Collect Decontaminated Soil

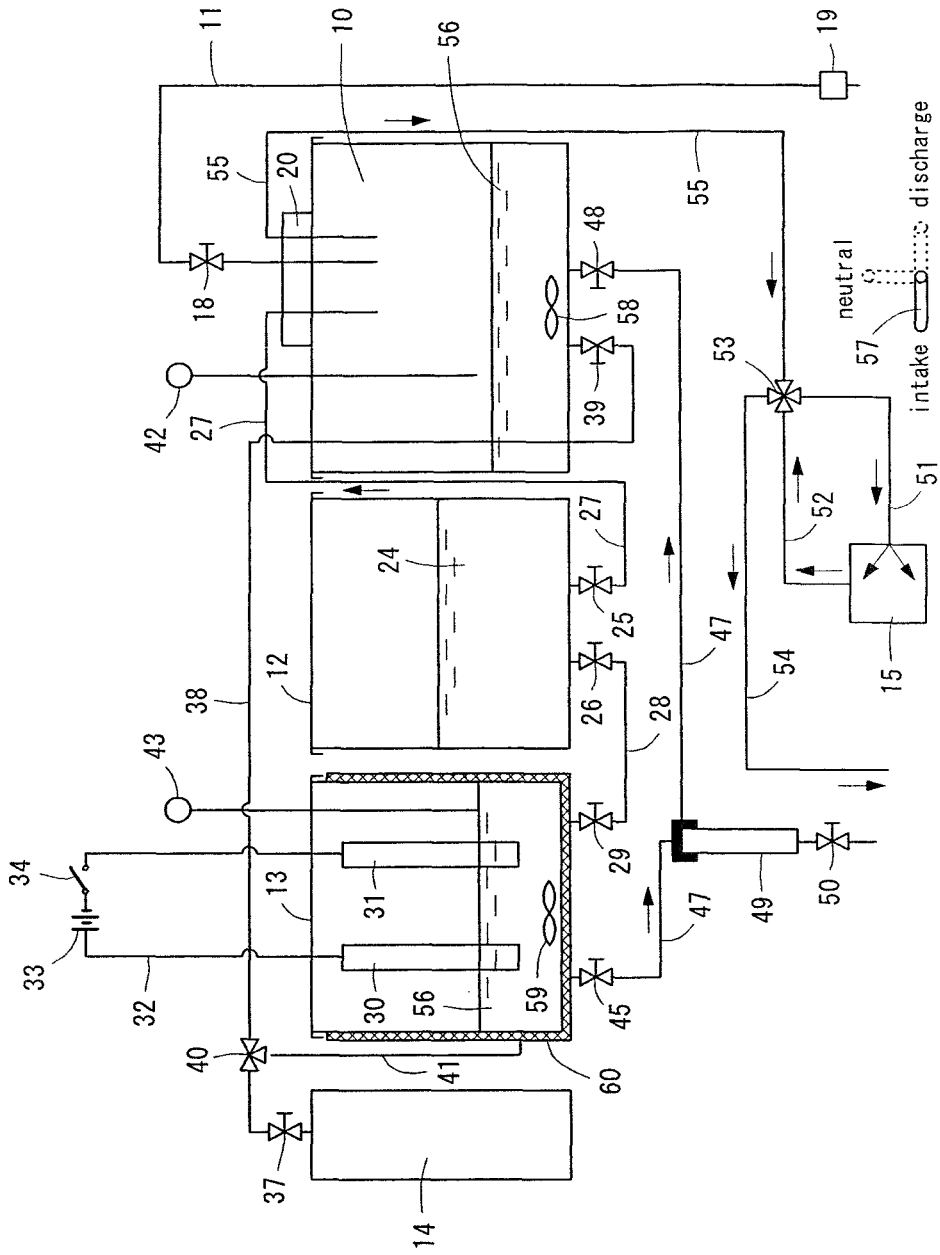
Fig. 9  After Concentration of Cesium, Move Carbonated Water to Separation Vessel Treatment of Decontaminated Soil
Fig. 10(a) Add Soil Activator
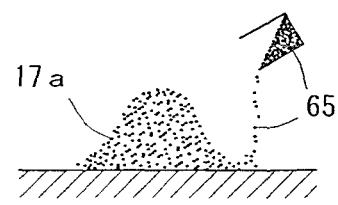
Fig. 10(b) Return Decontaminated Soil and Improved Soil to the Original Position
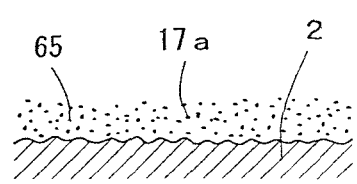
Fig. 11
Storage of Cesium Adsorbent
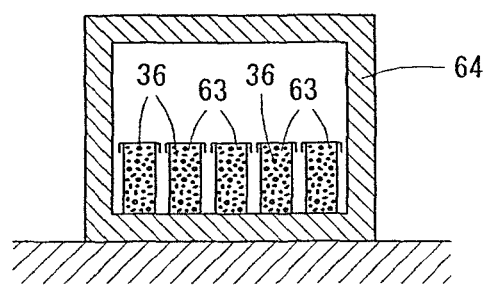

METHOD FOR DECONTAMINATING SOIL AND THE LIKE AND SYSTEM FOR DECONTAMINATING SOIL AND THE LIKE

This application is a 371 of PCT/JP2013/003786 filed Jun. 18, 2013; which claims priority from Japanese Patent Application No. 2012-183646 filed Aug. 22, 2012. The subject matter of each of the above-referenced applications is incorporated in entirety by reference.

BACKGROUND OF THE INVENTION

The present invention relates to, for example, a decontamination method and system for soil and the like for decontaminating soil such as fields and water contaminated with radioactive materials reliably and rapidly on site, performing decontamination with precision, and enhancing the efficiency of decontamination. The invention improves the decontaminated soil by adding a soil activator to the decontaminated soil, and then the improved soil is returned to the original field readily to promote the restart of farming. Further, the invention separates the radioactive materials adhering to or deposited on the soil from the soil precisely and then the radioactive materials are concentrated. The invention enables a reduction in the volume of the contaminated soil and achieves a safe treatment of the radioactive materials.

The Great East Japan Earthquake occurred on March 2011 caused an accident of the Fukushima Daiichi Nuclear Power Plant of Tokyo Electric Power Company. The accident has dispersed harmful radioactive materials in a wide area and contaminated cities and towns, fields, mountains and forests, the sea, lakes and marshes, and rivers. The radioactive materials adhered to or deposited on persons, animals, and plants have endangered their lives and caused serious damage, stopping various industrial activities such as farming, forestry, livestock farming, fishery, and the like.

Removal of such radioactive materials from living environments and industrial activity areas is mandatory for recovery and restart of industrial activities. Decontamination of soil in fields is an urgent problem especially for people engaged in farming.

Contamination has widely spread over fields and scattered throughout villages and mountains as well as plains. Decontaminating such wide areas with human power requires a great amount of time and labor, which is inefficient. The advanced age of many people engaged in farming also makes the decontamination work extremely difficult.

In order to deal with such contaminated soil or decontamination treatment, there is a method for decontaminating halide radioactive wastes by dissolving radioactive material into solvent and then separating the radioactive material from the solvent. In this case, halide is dissolved into water, which is a solvent, to precipitate rare earth elements in the solvent, and the precipitate is collected. As a means for separating the non-radioactive material from the solvent, the solvent is evaporated or cooled to precipitate the non-radioactive material (refer, for example, to Patent Literature 1).

However, in the above-mentioned decontamination method, the method in which halide is dissolved in water and the radioactive material is collected shows a low collection rate. Further, another method which includes steps of evaporation and cooling of the solvent requires a heating device and cooling facilities, thereby making the facilities large-scale and expensive.

Still another example of soil decontamination methods includes digging the soil contaminated with harmful chemical materials, putting the soil into a hopper of the heating device, and heating the soil while washing by using nitrogen to desorb and separate the contaminants in the soil (refer, for example, to Patent Document 2).

Such a decontamination method also has problems. The method requires time and labor for moving the contaminated soil to a remote decontamination device and additionally for returning the decontaminated soil to the original position. Further, the contaminated soil needs to be excavated deeply, not only the surface soil. Thus, the method requires an appropriate excavating facility, making the decontamination expensive and large-scale. Additionally, the decontamination device further requires a nitrogen washing machine, a heating device, and a separator, and thus making the decontamination large scale and expensive.

There is still another example of decontamination methods for soil contaminated with radioactive cesium. The contaminated soil is stored in a water supply tank, and carbon dioxide gas of high partial pressure is injected into the tank to supply hydrogen ions. After extracting cesium ions on the surfaces of soil particles into a liquid phase, the solution is shifted to a separation vessel which is open to air and the carbon dioxide gas is released into the air. Then, the pH value in the liquid phase is raised to precipitate and separate therefrom ions such as alkaline earth metals other than cesium, the precipitate being carbonates or hydroxides thereof, and the cesium remaining in the liquid phase is concentrated and separated (refer, for example, to non-patent document 1).

The above described soil decontamination method also has shortcomings. In the above described decontamination method, the liquid phase of supernatant fluid of the water supply tank is sent to the separation vessel so that the supernatant fluid does not contain much cesium, which has a high specific gravity. This leads to a low efficiency of concentration and separation of cesium. Further, cesium accumulates in the lower part of the water supply tank and promotes attachment and deposition onto the soil, and thereby lowering the effect of decontamination. Accordingly, use of decontaminated soil has been difficult and impractical.

Another decontamination method for soil contaminated with radioactive cesium includes adding water to the contaminated soil received in the reaction vessel, placing anode and cathode electrodes in the reaction vessel, applying a voltage to the electrodes to attract radioactive cesium ions onto the cathode, depositing soil and other matter associated therewith onto the anode electrode, and separating and collecting the radioactive cesium from the contaminated soil to significantly reduce the volume of the contaminants (Refer, for example, to non-patent document 2).

However, such decontamination method for soil also has problems. Since the soil is received in the reaction vessel together with other matter, the method requires a high voltage application, which results in poor efficiency. The radioactive cesium ions attracted to the cathode contain foreign materials so that the cesium ions are separated with a low accuracy. Further, since the decontaminated soil also contains other matter, the separation process is time-consuming and the decontaminated soil cannot be used quickly. The following is a list of background art referred to herein:
[Patent Literature 1] JP-A-10-213697
[Patent Literature 2] JP-A-5-192648
[Non-Patent Literature]
[Non-Patent Literature 1]

Choji, Tetsuji Takada, Eiji Tafu, Masamoto (Toyama National College of Technology) Hara, Masanori (University of Toyama)

Houshasei-seshiumu Osendojyo wo Tansan-gasu nomide Senjyo, Shufuku suru Anzen Anshin na Kahan-gata Souchi no Kouchiku (Construction of Safe and Portable Apparatus for Cleaning and Repairing Soil Contaminated with Radioactive Cesium by Using Only Carbon Dioxide Gas), The First Fukushima Conference's Summary The Society for Remediation of Radioactive Contamination in Environment, 21

[Non-Patent Literature 2]

Ueda, Yuko Watanabe, Isao Toida, Hideki Honda, Katsuhisa (Center of Advanced Technology for the Environment, Faculty of Agriculture, Ehime University)

Denki Bunkai wo Riyou shita Houshaseibushitsu Jyosen Gijyutsu no Teian (Proposal for Decontamination Technique of Radioactive Materials Using Electrolysis)

The First Fukushima Conference's Summary

The Society for Remediation of Radioactive Contamination in Environment, 92

SUMMARY OF INVENTION

The present invention addresses such problems and aims to provide, for example, a decontamination method and system for soil and the like for decontaminating soil such as fields and water contaminated with radioactive materials reliably and rapidly on site, performing decontamination with precision, and enhancing the efficiency of decontamination. The invention improves the decontaminated soil by adding a soil activator to the decontaminated soil, and then the improved soil is returned to the original field readily to promote the restart of farming. Further, the invention separates the radioactive materials adhering to or deposited on the soil from the soil precisely and then the radioactive materials are concentrated. The invention enables a reduction in the volume of the contaminated soil and achieves a safe treatment of the radioactive materials.

According to a first aspect of the invention, a decontamination method for soil and the like includes: introducing an object to be decontaminated, contaminated with radioactive material, into an acid eluting solvent to dissolve the radioactive material; concentrating and separating the radioactive material from the eluting solvent; the object to be decontaminated including contaminated soil and/or contaminated liquid; introducing one or both of the contaminated soil and the contaminated liquid into the eluting solvent; separating the radioactive material dissolved into the eluting solvent and the object to be decontaminated into solid and liquid; collecting the soil which has been separated from the eluting solvent; and concentrating the eluting solvent which has been separated from the soil and in which the radioactive material is dissolved. Accordingly, the method can be applied to a wide area of contaminated soil and contaminated liquid, that are to be decontaminated, and ensures convenience for users. The radioactive materials, the soil, the contaminated water, that are to be decontaminated, dissolved in the eluting solvent in the separation vessel are separated into solid and liquid, the soil which has been separated from the eluting solvent and does not contain the radioactive material is collected. The decontaminated soil is, therefore, reused, to facilitate the restart of farming promptly.

According to a second aspect of the invention, the radioactive material is concentrated and separated at a collection site of the object to be decontaminated. Accordingly, the contaminated soil does not need be carried to remote disposal facilities for contaminated materials, and the decontamination work is carried out rationally and promptly.

According to a third aspect of the invention, the eluting solvent which has been separated from the soil and in which the radioactive material is dissolved is concentrated and electrolyzed by using the eluting solvent as an electrolyte. Accordingly, the eluting solvent is used for dissolving the radioactive material and the resulting solution is subjected to electrolysis for concentrating the radioactive material, thus allowing the eluting solvent to be used rationally and effectively.

According to a fourth aspect of the invention, the eluting solvent into which the object to be decontaminated is introduced and in which the radioactive material is dissolved is moved from a solid-liquid separation process to a concentration process. Accordingly, the solid-liquid separation process and the concentration process are performed successively, making the decontamination treatment rational and speedy.

According to a fifth aspect of the invention, the eluting solvent in which the radioactive material is concentrated is refluxed as the eluting solvent for introducing the object to be decontaminated. Accordingly, the eluting solvent is used rationally and effectively, and eluting solvent can be used even at the collection site of the object to be decontaminated, where water cannot be obtained easily.

According to a sixth aspect of the invention, the eluting solvent is carbonated water. Accordingly, use of oxalic acid, which is expensive and difficult to handle, is eliminated, thereby achieving a safe decontamination at low cost.

According to a seventh aspect of the invention, the carbonated water is prepared at a collection site of the object to be decontaminated. Accordingly, the carbonated water is formed rationally in accordance with the collected amount of the object to be decontaminated.

According to an eighth aspect of the invention, the method further includes adding a soil activator to the soil which has been collected, and the soil and the activator are returned to a collection site of the object to be decontaminated. Accordingly, the decontaminated soil is improved or modified, and then the improved or modified soil is returned to the collection site to promptly restart farming.

According to a ninth aspect of the invention, the soil activator is a powder fire extinguishant which includes monobasic ammonium phosphate or ammonium sulfate. The fire extinguishant used may be one for which the expiry date has passed, thereby allowing the fire extinguishant to be used rationally despite being past its expiry date.

According to a tenth aspect of the invention, the method includes the steps of collecting the object to be decontaminated, dissolving the radioactive material from the object to be decontaminated, performing solid-liquid separation, collecting the soil, concentrating and separating the radioactive material, adding the soil activator, and returning of the soil to which the soil activator has been added. The above steps are associated with each other and performed at the collection site of the object to be decontaminated. Accordingly, a series of decontamination steps can be carried out rationally and organically.

According to an eleventh aspect of the invention, the radioactive material is cesium. Accordingly, the radioactive material scattered across fields, paddy fields, and wetlands, and endangers lives of animals and plants can be removed.

According to a twelfth aspect of the invention, the system includes a separation vessel for receiving an object to be decontaminated contaminated with radioactive material and an acid eluting solvent, and for dissolving the radioactive material in the eluting solvent; a concentration tank for receiving the object to be decontaminated and the eluting solvent in which the radioactive material is dissolved, and for concentrating and separating the radioactive material; wherein the object to be decontaminated comprises contaminated soil and contaminated liquid, one or both of the contaminated soil and the contaminated liquid can be introduced into the separation vessel, the separation vessel and the concentration tank are in communication with each other via a solid-liquid conduit, the solid-liquid conduit is provided with a solid-liquid separation filter for separating the soil and the eluting solvent in which the radioactive material is dissolved, and wherein the soil which has been separated from the eluting solvent can be collected from the filter. Accordingly, the system can be applied to a wide area of contaminated soil and contaminated liquid that are to be decontaminated, and ensures convenience for users. Further, the soil which has been separated from the eluting solvent and does not contain the radioactive material is collected from the solid-liquid separation filter. The decontaminated soil can therefore be reused to facilitate the restart of farming promptly.

A thirteenth aspect of the invention is a decontamination vehicle which can be driven to a collection site of the object to be decontaminated, and the vehicle is equipped with a separation vessel, the concentration tank, solid-liquid separation filter, a carbon-dioxide gas cylinder for generating the eluting solvent, and a water supply tank. Accordingly, the decontamination vehicle is equipped with a series of decontamination facilities so that the vehicle can be moved freely and moved to, for example, a remote collection site of the object to be decontaminated or in mountains. Additionally, the system aims to improve the efficiency of decontamination by improving the vehicle's mobility.

According to a fourteenth aspect of the invention, the separation vessel is provided with a suction pump for supplying and discharging air, and the system further comprises an expandable and contractible suction hose which is in communication with the suction pump and the separation vessel, and the suction hose has one end which sucks the object to be decontaminated. Accordingly, the system is light and therefore easy to use because it does not require heavy machinery and facilities, which is expensive.

According to a fifteenth aspect of the invention, the soil and the eluting solvent in which the radioactive material is dissolved is moved from the separation vessel to the concentration tank via the solid-liquid conduit. Accordingly, the solid and liquid components are moved from the separation vessel to the concentration tank.

According to a sixteenth aspect of the invention, the eluting solvent in which the radioactive material is concentrated and separated is moved from the concentration tank to the separation vessel via the solid-liquid conduit. Accordingly, the eluting solvent after decontamination can be used in the separation vessel, and can be used rationally and effectively.

According to a seventeenth aspect of the invention, the solid-liquid separation filter is provided with a discharge valve, and the soil which has been accumulated in the filter and separated from the eluting solvent can be collected. Accordingly, the decontaminated soil is collected easily.

According to a first aspect of the invention, a decontamination method for soil and the like including: introducing an object to be decontaminated, contaminated with radioactive material, into an acid eluting solvent to dissolve the radioactive material; concentrating and separating the radioactive material from the eluting solvent; the object to be decontaminated including contaminated soil and contaminated liquid; introducing one or both of the contaminated soil and the contaminated liquid into the eluting solvent; separating the radioactive material dissolved into the eluting solvent and the object to be decontaminated into solid and liquid; collecting the soil which has been separated from the eluting solvent; and concentrating the eluting solvent which has been separated from the soil and in which the radioactive material is dissolved. Accordingly, the method can be applied to a wide area of contaminated soil and contaminated liquid, that are to be decontaminated, and ensures convenience for users. The radioactive materials, the soil, the contaminated water, that are to be decontaminated, dissolved in the eluting solvent in the separation vessel are separated into solid and liquid, the soil which has been separated from the eluting solvent and does not contain the radioactive material is collected. The decontaminated soil can therefore be reused to facilitate the restart of farming.

According to a second aspect of the invention, the radioactive material is concentrated and separated at a collection site of the object to be decontaminated. Accordingly, the contaminated soil does not need be carried to remote disposal facilities for contaminated materials, and the decontamination work can be carried out rationally and promptly.

According to a third aspect of the invention, the eluting solvent which has been separated from the soil and in which the radioactive material is dissolved is concentrated and electrolyzed by using the eluting solvent as an electrolyte. Accordingly, the eluting solvent is used for dissolving the radioactive material and used as electrolysis for concentrating the radioactive material, and allowing the eluting solvent to be used rationally and effectively.

According to a fourth aspect of the invention, the eluting solvent into which the object to be decontaminated is introduced and in which the radioactive material is dissolved is moved from a solid-liquid separation process to a concentration process. Accordingly, the solid-liquid separation process and the concentration process are performed successively, making the decontamination treatment rationally and speedily.

According to a fifth aspect of the invention, the eluting solvent in which the radioactive material is concentrated is refluxed as the eluting solvent for introducing the object to be decontaminated. Accordingly, the eluting solvent is used rationally and effectively, and eluting solvent can be used even at the collection site of the object to be decontaminated, where water cannot be obtained easily.

According to a sixth aspect of the invention, the eluting solvent is carbonated water. Accordingly, use of oxalic acid, which is expensive and difficult to handle, is eliminated, thereby achieving a safe decontamination at low cost.

According to a seventh aspect of the invention, the carbonated water is prepared at a collection site of the object to be decontaminated. Accordingly, the carbonated water can be formed rationally in accordance with the collected amount of the object to be decontaminated.

According to an eighth aspect of the invention, the method further includes adding a soil activator to the soil which has been collected, and the soil and the activator are returned to a collection site of the object to be decontaminated. Accordingly, the decontaminated soil is improved or modified, and then the improved or modified soil is returned to the collection site to prompt restart of farming.

According to a ninth aspect of the invention, the soil activator is a powder fire extinguishant which includes monobasic ammonium phosphate or ammonium sulfate. Accordingly, a fire extinguishant, for example, a fire extinguishant in a fire extinguisher of which the expiry date has passed, is used, thereby allowing the fire extinguishant to be used rationally.

According to a tenth aspect of the invention, the method includes the steps of collecting the object to be decontaminated, dissolving the radioactive material from the object to be decontaminated, performing solid-liquid separation, collecting the soil, concentrating and separating the radioactive material, adding the soil activator, and returning of the soil to which the soil activator has been added. The above steps are associated with each other and performed at the collection site of the object to be decontaminated. Accordingly, a series of decontamination process can be carried out rationally and organically.

According to an eleventh aspect of the invention, the radioactive material is cesium. Accordingly, the radioactive material scattered across fields, paddy fields, and wetlands, and endangers lives of animals and plants can be removed.

According to a twelfth aspect of the invention, the system includes a separation vessel for receiving an object to be decontaminated contaminated with radioactive material and an acid eluting solvent, and for dissolving the radioactive material in the eluting solvent; a concentration tank for receiving the object to be decontaminated and the eluting solvent in which the radioactive material is dissolved, and for concentrating and separating the radioactive material; wherein the object to be decontaminated comprises contaminated soil and contaminated liquid, one or both of the contaminated soil and the contaminated liquid can be introduced into the separation vessel, the separation vessel and the concentration tank are in communication with each other via a solid-liquid conduit, the solid-liquid conduit is provided with a solid-liquid separation filter for separating the soil and the eluting solvent in which the radioactive material is dissolved, and wherein the soil which has been separated from the eluting solvent can be collected from the filter. Accordingly, the system can be applied to a wide area of contaminated soil and contaminated liquid that are to be decontaminated, and ensures convenience for users. Further, the soil which has been separated from the eluting solvent and does not contain the radioactive material is collected from the solid-liquid separation filter. The decontaminated soil can therefore be reused to facilitate the restart of farming promptly.

A thirteenth aspect of the invention is a decontamination vehicle which can be driven to a collection site of the object to be decontaminated, and the vehicle is equipped with a separation vessel, the concentration tank, solid-liquid separation filter, a carbon-dioxide gas cylinder for generating the eluting solvent, and a water supply tank. Accordingly, the decontamination vehicle is equipped with a series of decontamination facilities so that the vehicle can be moved freely and moved to, for example, a remote collection site of the object to be decontaminated or in mountains. Additionally, the system aims to improve the efficiency of decontamination by improving the vehicle's mobility.

According to a fourteenth aspect of the invention, the separation vessel is provided with a suction pump for supplying and discharging air, and the system further comprises an expandable and contractible suction hose which is in communication with the suction pump and the separation vessel, and the suction hose has one end which sucks the object to be decontaminated. Accordingly, the system is light and therefore easy to use because it does not require heavy machinery and facilities, which is expensive.

According to a fifteenth aspect of the invention, the soil and the eluting solvent in which the radioactive material is dissolved is moved from the separation vessel to the concentration tank via the solid-liquid conduit. Accordingly, the solid and liquid components are moved from the separation vessel to the concentration tank.

According to a sixteenth aspect of the invention, the eluting solvent in which the radioactive material is concentrated and separated is moved from the concentration tank to the separation vessel via the solid-liquid conduit. Accordingly, the eluting solvent after decontamination can be used in the separation vessel, and can be used rationally and effectively.

According to a seventeenth aspect of the invention, the solid-liquid separation filter is provided with a discharge valve, and the soil which has been accumulated in the filter and separated from the eluting solvent can be collected. Accordingly, the decontaminated soil is collected easily.

BRIEF DESCRIPTION OF THE DRAWINGS

FIGS. 4(a) (I), 4(a) (II), 4(b), 4(c), 4(d), 4(e), 4(f) and 4(g) are explanatory diagrams showing procedures of decontamination work of soil according to the invention.

FIG. 5 is an explanatory diagram showing a state of decontamination work of soil according to the invention, and showing a state in which before the contaminated soil is introduced into the separation vessel and before radioactive cesium is separated.

FIG. 7 is an explanatory diagram showing a state of decontamination work according to the invention, and showing a state in which radioactive cesium is separated in the separation vessel, and the carbonated water and the soil to be contaminated is moved to the solid-liquid separation filter and the concentration tank 13.

FIG. 8 is an explanatory diagram showing a state of decontamination work according to the invention, and radioactive cesium is concentrated in the concentration tank and the soil to be decontaminated is collected.

FIG. 9 is an explanatory diagram showing a state of decontamination work according to the invention, showing a state in which radioactive cesium is concentrated in the concentration tank and then the carbonated water is moved to the separation vessel.

FIGS. 10(a) and 10(b) show a state of treatment of the soil after decontamination according to the invention.

FIG. 11 is a state in which the radioactive-cesium-adsorbed adsorbent is stored according to the invention.

DETAILED DESCRIPTION OF THE INVENTION

Figure 1:
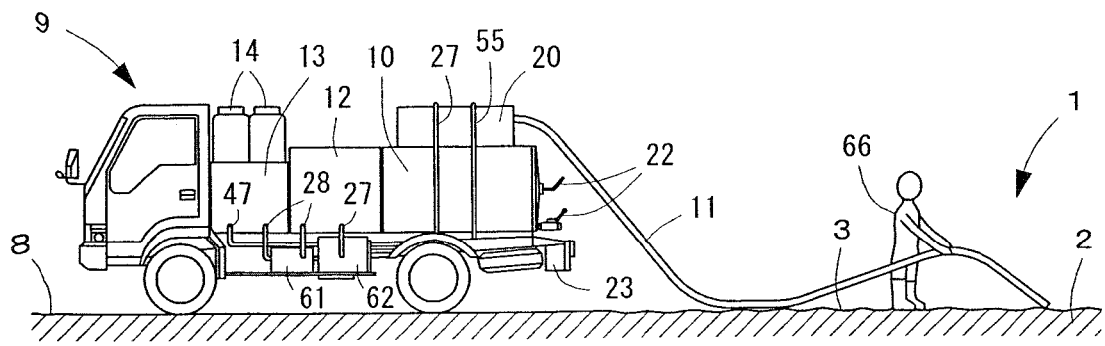
FIG. 1 is a front view showing a state of a decontamination work using the decontamination vehicle equipped with the decontamination facilities of the invention.

Embodiments of the present invention will be described below with reference to the drawings, in which the invention is applied to decontamination of soil in fields, paddy fields, wetlands, and the like. In FIGS. 1 through 11, reference numeral 1 is an object area to be decontaminated. The object area includes a field 3 with a surface soil 2 having a predetermined moisture or dried and hardened. The object area also includes paddy field 5, the surface soil 2 of which is submerged into contaminated water 4, and wetlands having a large amount of water. The invention can deal with decontamination for both cases. In drawings, reference numeral 6 represents weeds on the surface soil 2 of the field 3, and reference numeral 7 represents rice plants and weeds on the surface soil 2 in the contaminated water 4.

A decontamination vehicle 9 is parked in a farm road 8 or a space adjacent to the object area to be decontaminated 1. A suction hose 11 is pulled out from a decontamination tank, and a predetermined contaminated soil or liquid is sucked and collected from the end of the hose 11. In drawings, reference numeral d represents a depth of suction or collection of the surface soil 2 of the fields 3, and corresponds to a penetration depth of cesium, which is a radioactive material. In the embodiment, the surface soil 2 of 5 cm or more is collected.

The decontamination vehicle 9 has a structure based on a conventional vacuum vehicle, and the vehicle body is equipped with a separation tank 10 of the decontamination tank, a water supply tank 12, a concentration tank 13 or an electrolysis tank, a gas cylinder 14 filled with carbon dioxide having a predetermined pressure, and a suction pump 15 for sucking solid, liquid, and gas.

The separation tank 10 is formed by a box container having an openable lid. The separation tank 10 is provided at the top of the lid with a rotatable cylindrical reel 16 around which the suction hose 11 can be wound. The reel 16 is rotatably biased in the counterclockwise direction in FIG. 3 via a recoil spring (not shown) and around which the suction hose 11 can be wound.

When the contaminated soil is sucked, the suction hose 11 is pulled outwardly. The pulling force enables the reel 16 to rotate in the clockwise direction in FIG. 3, thereby unreeling the suction hose 11.

One end of the suction hose 11 is in communication with the inside of the separation vessel 10. The contaminated soil 17 or contaminated liquid sucked from the tip end is introduced into the separation vessel 10. The base part of the suction hose 11 is provided with an on-off valve 18. The other end of the suction hose 11 is provided with a filter 19 for preventing foreign matter to be sucked.

In drawings, reference numeral 20 is a cylindrical hose guide concentrically provided outside the reel 16, and the connecting portion of the hose guide is formed with a hose insertion hole 21. Reference numeral 22 is a hose clamp provided at the rear end of the separation vessel 10, and reference numeral 23 is a bottomed hose receptacle.

The water supply tank 12 is formed by a box container having an openable lid and is provided adjacent to the separation vessel 10. The water supply tank 12 stores clean water 24 therein for supplying a predetermined amount of water to the separation vessel 10 and the concentration tank 13. In this case, it is preferable that a heater is provided on the periphery of the water supply tank 12 to prevent water from freezing.

The on-off valves 25, 26 are provided at the bottom of the water supply tank 12. Respective one ends of water supply conduits 27, 28 are connected to the on-off valves 25, 26. The other end of the water supply conduit 27 is provided at the upper part in the separation vessel 10, and the other end of the water supply conduit 28 is connected to the on-off valve 29 provided at the bottom of the concentration tank 13.

The concentration tank 13 is formed by a box container having an openable lid and provided adjacent to the water supply tank 12. A pair of anode and cathode 30, 31 is provided inside the concentration tank 13, and the leads 32 are connected to the electrodes 30, 31. The DC power 33 and the switch 34 are interposed between the leads 32, and the concentration tank 13 functions as an electrolysis tank.

A cylindrical basket 35 having a bottom is provided on the lower half periphery of the cathode 31 to surround the cathode. Zeolite 36, which is an adsorbent, is received in the basket 35. After the zeolite adsorbs a predetermined amount of radioactive cesium, the zeolite is taken out from the concentration tank 13 together with the basket 35.

A gas cylinder 14 stands in a space defined by the water supply tank 12 and the concentration tank 13. An on-off valve 37 is provided at the top end of the gas cylinder 14. One end of a gas conduit 38 is connected to the on-off valve 37, and the other end of the gas conduit 38 is connected to a on-off valve 39 provided at the bottom of the separation vessel 10.

A three-way valve 40 is provided between the gas conduits 38. One end of the gas conduit 41 is connected to the three-way valve 40, and the other end of the gas conduit 41 is connected to the lower peripheral surface of the concentration tank 13 to enable carbon dioxide to be supplied to the water supply tank 12 and the concentration tank 13 selectively.

Carbon dioxide is supplied from the gas conduit 38 to the separation vessel 10 in which water has been supplied. Carbonated water 56 having a predetermined acid concentration is prepared and kept in the separation vessel 10 as an eluting solvent for radioactive cesium. In this embodiment, the acid concentration of the carbonated water 56 in the separation vessel 10 is set to pH 3 to 7.

After radioactive cesium is separated in the separation vessel 10, carbonated water 56 is sent to the concentration tank 13 from the separation vessel 10. When the acid concentration of the carbonated water 56 is decreased, or when electrolysis is carried out in the concentration tank 13 by using the carbonated water 56 as an electrolytic solution and then the acid concentration of the carbonated water 56 is decreased, carbon dioxide is supplied to the concentration tank 13 from the gas conduit 41 to maintain a constant level of acid concentration of the carbonated water 56 in the concentration tank 13.

In drawings, reference numerals 42, 43 represent pH sensors provided in the separation vessel 10 and the concentration tank 13 for measuring acid concentration of the carbonated water 56.

An on-off valve 45 is provided at the bottom of the concentration tank 13, and a solid-liquid conduit 47 is connected to on-off valve 45. The other end of the conduit 47 is connected to an on-off valve 48 provided at the bottom of the separation vessel 10. With this configuration, radioactive cesium separated in the separation vessel 10 and solid-liquid mixture in which carbonated water is mixed is movable from the separation vessel 10 to the concentration tank 13, while carbonated water 56 in which radioactive cesium is concentrated is movable from the concentration tank 13 to the separation vessel 10.

In this case, it is preferable that a return pipe separate from the solid-liquid conduit 47 be provided between the separation vessel 10 and the concentration tank 13 to complement the solid-liquid conduit 47.

The solid-liquid separation filter 49 is provided vertically between the solid-liquid conduits 47. The filter 49 separates the soil 17a from the carbonated water. Here, the soil 17a has been separated from the radioactive cesium in the separation vessel 10, and radioactive cesium is dissolved in the carbonated water. Heavy soil 17 is allowed to sink to the lower part of the filter 47, and thereby allowing light carbonated water 56 which includes no soil 17a to move to the separation vessel 13.

A solid-liquid separation filter 49 in the embodiment includes a centrifuge having a rotating tube (not shown) inside. When the solid and liquid components are moved from the separation vessel 10 to the concentration tank 13, the centrifuge is activated so that heavy soil 17a is moved to the outer side within the rotating tube and light carbonated water 56 which does not include the soil 17a is moved to the inner side within the rotating tube, and whereby solid-liquid separation is performed.

On that occasion, the radioactive cesium ions are separated while dissolved in the carbonated water 56. The carbonated water 56 adhered to the soil 17a is separated from the soil 17a together with the radioactive cesium ions by the centrifugal effect. Substantially all the amount of the radioactive cesium ions is sent to the concentration tank 13 together with the carbonated water 56. Accordingly, heavy soil 17a which includes no radioactive cesium ion is allowed to sink and accumulate in the lower part of the separation filter 49.

Accordingly, by providing a plurality of solid-liquid separation filters 49 in the solid-liquid conduit 47, the radioactive cesium ions can be separated from the soil 17a with a high accuracy.

When clean carbonated water 56 which does not include radioactive cesium ion is moved from the concentration tank 13 to the separation vessel 10 after radioactive cesium is concentrated in the concentration tank 13, the centrifuge is stopped, thereby enabling the carbonated water 56 to be moved.

In drawings, reference numeral 50 represents a discharge valve provided at the lower part of the solid-liquid separation filter 49. By opening the discharge valve 50, the soil 17 stored inside the filter 49 can be taken outside and collected.

A pair of loop conduits 51, 52 has respective one ends connected to the suction pump 15, and has respective other ends connected to a four-way valve 53. A vent pipe 54 open to air has one end connected to one of the ports of the four-way valve 53, and the communication pipe 55 provided in the separation vessel 10 is connected to the other port of the four-way valve 53.

The port of the four-way valve 53 can be switched by a switching lever 57, whereby intake and discharge operation among the vent pipe 54 and the communication pipe 55 that are connected to the four-way valve 53, and the suction hose 11 provided in the separation vessel 10 are controlled.

Figure 6:
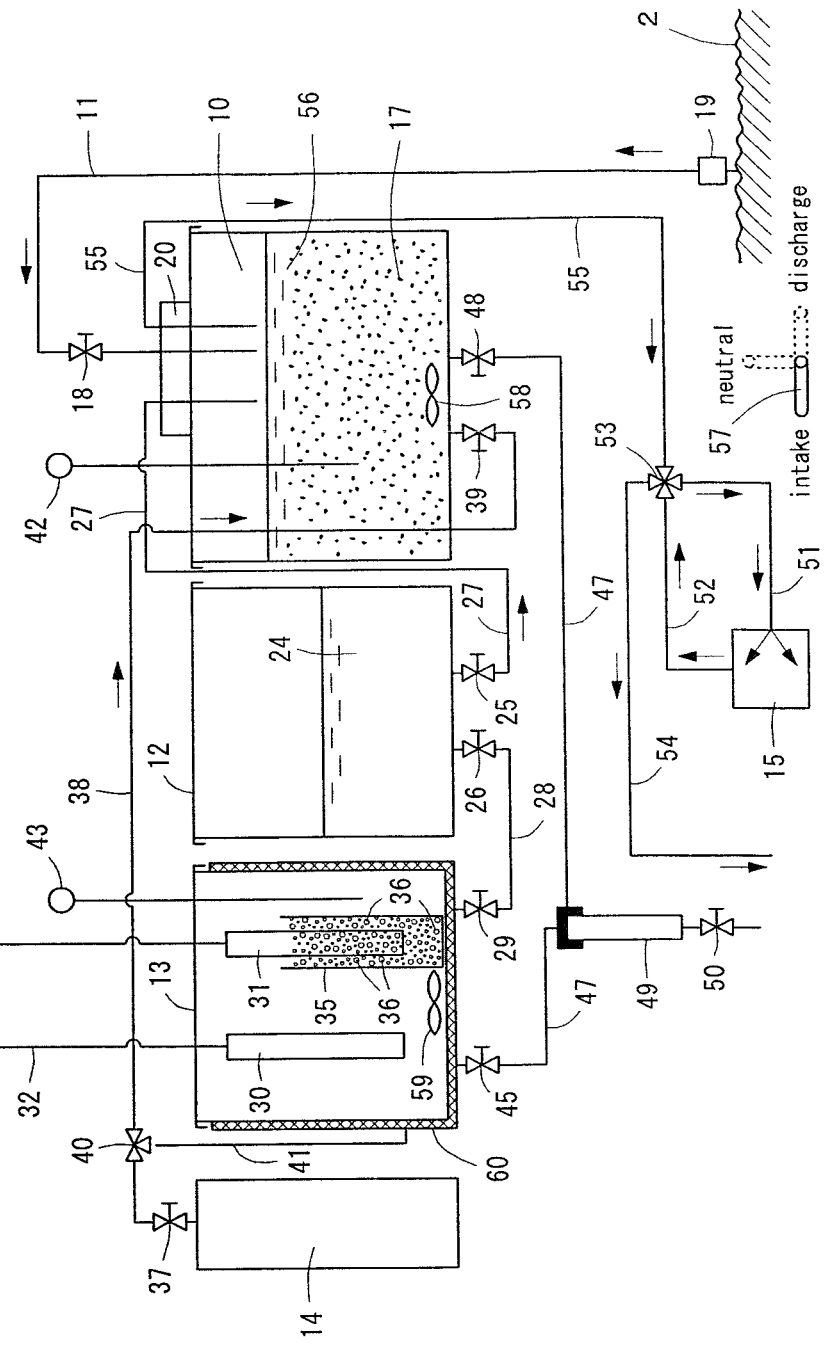
FIG. 6 is an explanatory diagram showing a state of decontamination work according to the invention, and showing a state in which the contaminated soil is introduced into the separation vessel where the carbonated water is formed, and showing a state in which radioactive cesium is dissolved and separated.

Specifically, when the contaminated soil 17 is collected and introduced into the separation vessel 10, the suction pump 15 is actuated, and the switching lever 57 is changed from a neutral position to an intake position, as shown in FIG. 6. The loop conduits 51, 52 are communicated with the communication pipe 55, and then negative pressure is created in the separation vessel 10 and the suction hose 11. The contaminated soil 17 of the surface soil 2 is sucked from the end portion of the suction hose 11 and then introduced into the separation vessel 10 through the suction hose 11.

When the decontaminated soil 17a is moved to the solid-liquid filter 49 and carbonated water 56 to the concentration tank 13, after separation of radioactive cesium in the separation vessel 10, the suction pump 15 is actuated, and the switching lever 57 is switched from the intake position to the discharge position, as shown in FIG. 7. The loop conduits 51, 52, and the vent pipe 54 are communicated with the communication pipe 55, the on-off valves 18, 39 are closed, and at the same time, the on-off valves 45, 48 are opened, thereby suctioning air from the vent pipe 54. The air suctioned is sent to the communication pipe 55 from the loop conduits 51, 52. The separation vessel 10 is then pressurized to send the soil 17a and the carbonated water 56 in the separation vessel 10 to the solid-liquid conduit 47, and further to send the carbonated water 56 to the concentration tank 13 from the solid-liquid filter 49.

Additionally, when the carbonated water 56 in the concentration tank 13 is returned to the separation vessel 10, after concentration of cesium, the suction pump 15 is actuated, and the switching lever 57 is then switched from the discharge position to the intake position as shown in FIG. 9. The on-off valves 18, 39 are closed, and at the same time, the on-off valves 45, 48 are opened to create a negative pressure in the separation vessel 10 through the communication pipe 55. Negative pressure is created in the solid-liquid conduit 47 communicating with the separation vessel 10. The carbonated water 56 in the concentration tank 13 is sucked in the solid-liquid conduit 47, and then introduced into the separation vessel 10.

In drawings, reference numerals 58, 59 represent agitators such as a fan, stirrer, or ultrasonic transducers provided at the bottom of the separation vessel 10 and the concentration tank 13. Reference numeral 60 represents a heater provided to cover the periphery of the concentration tank 13. Reference numerals 61, 62 represent water supply pumps provided in the water supply conduits 27, 28. Reference numeral 63 represents an airtight container for safely containing the cesium-adsorbed adsorbent 36, and the container is stored in a safe concrete storage facilities 64.

Additionally, in drawings, reference numeral 65 represents a soil activator which is to be added to the soil 17a after decontamination. The soil activator includes organic fertilizers such as compost, mycorrhizal fungi, or various kinds of chemical fertilizers containing nitrogen, phosphorus, and kalium. They are added to and mixed with the soil 17a, and the soil 17a is returned to the original field 17a in which the soil has been collected. In drawings, reference numeral 66 is a decontamination worker.

In the embodiment, a powder fire extinguishant in a fire extinguisher of which the expiry date has passed and contains monobasic ammonium phosphate or ammonium sulfate is used, and whereby the fire extinguishant can be used effectively.

Figure 2:
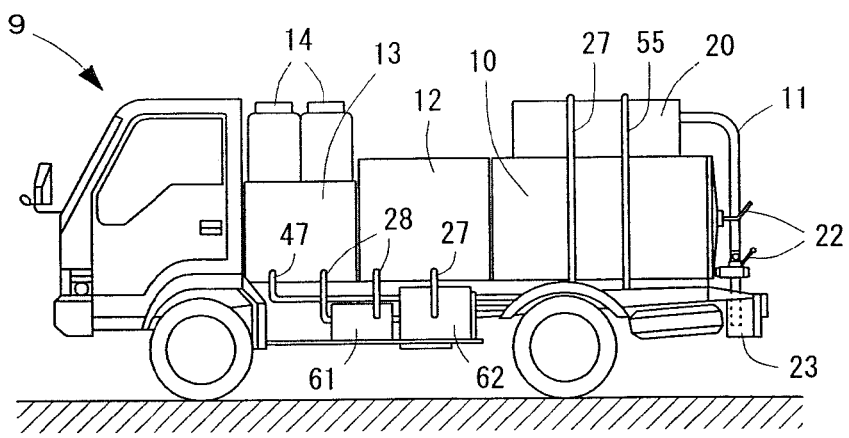
FIG. 2 is a front view showing the decontamination vehicle enlarged of FIG. 1.
Figure 3:
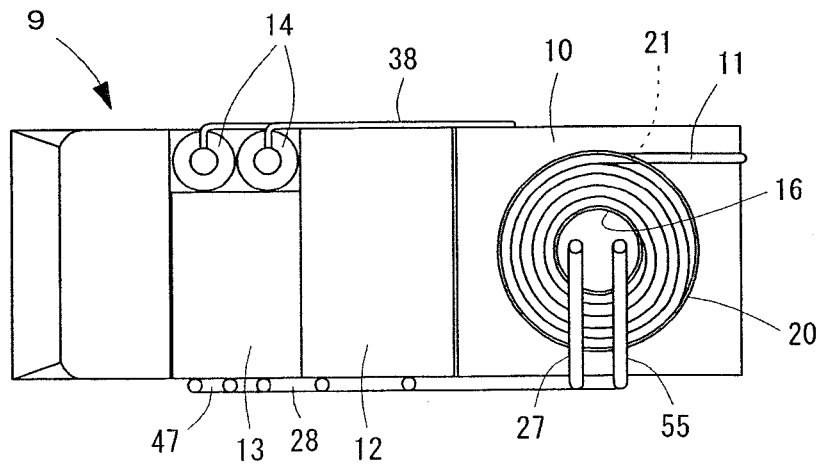
FIG. 3 is a plan view of FIG. 2.

The decontamination method and system for soil and the like thus configured requires the decontamination vehicle 9 constituted based on a conventional vacuum car. The decontamination vehicle body is mounted thereon with the separation vessel 10, the water supply tank 12, the concentration tank 13, the gas cylinder 14 filled with carbon dioxide, the suction pump 15 for sucking solids such as soil, gravel, and trees and plants, liquid such as water accumulated in paddy fields or wetlands, gas such as the air, the solid-liquid separation filter 49, and the soil activator 65. This state is shown in FIGS. 2 and 3.

The separation tank 10 is formed by a box container having an openable lid. The separation tank 10 is provided at the top with a rotatable cylindrical reel 16 around which the suction hose 11 can be wound. The reel 16 is rotatably biased in the counterclockwise direction in FIG. 3 via a recoil spring (not shown) and around which the suction hose 11 can be wound.

When the contaminated soil is sucked, the suction hose 11 is pulled outwardly. The pulling force enables the reel 16 to rotate in the clockwise direction and thereby unreeling the suction hose 11.

One end of the suction hose 11 is in communication with the inside of the separation vessel 10. The contaminated soil 17 sucked from the other end is introduced into the separation vessel 10. The base part of the suction hose 11 is provided with an on-off valve 18. The other end of the suction hose 11 is provided with a filter 19 for preventing foreign matter to be sucked.

The water supply tank 12 is formed by a box container having an openable lid and provided adjacent to the separation vessel 10. The water supply tank 12 stores a predetermined amount of clean water 24 inside for supplying the water to the separation vessel 10 and the concentration tank 13.

The on-off valves 25, 26 are provided at the bottom of the water supply tank 12. Respective one ends of water supply conduits 27, 28 are connected to the on-off valves 25, 26. The other end of the water supply conduit 27 is provided at the top of the separation vessel 10, and the other end of the water supply conduit 28 is connected to the on-off valve 29 provided at the bottom of the concentration tank 13. The water supply pumps 61, 62 are provided in the water supply conduits 27, 28.

The concentration tank 13 is formed by a box container having an openable lid, and provided adjacent to the water supply tank 12. A pair of anode and cathode 30, 31 is provided inside the concentration tank 13, and the leads 32 are connected to the electrodes 30, 31. The DC power 33 and the switch 34 are interposed between the leads 32.

A cylindrical basket 35 having a bottom is provided on the lower half periphery of the cathode 31 to surround the cathode. Zeolite 36, which is an adsorbent, is received in the basket 35. After the zeolite adsorbs a predetermined amount of radioactive cesium, the zeolite is taken out from the concentration tank 13 together with the basket 35.

The gas cylinder 14 stands in a space defined by the water supply tank 12 and the concentration tank 13. An on-off valve 37 is provided at the top of end the gas cylinder 14. One end of a gas conduit 38 is connected to the on-off valve 37, and the other end of the gas conduit 38 is connected to a on-off valve 39 provided at the bottom of the separation vessel 10.

The three-way valve 40 is provided between the gas conduits 38. One end of the gas conduit 41 is connected to the three-way valve 40, and the other end of the gas conduit 41 is connected to the lower peripheral surface of the concentration tank 13 to enable carbon dioxide to be supplied to the water supply tank 12 and the concentration tank 13, selectively.

The solid-liquid separation filter 49 is vertically provided at the middle position of the solid-liquid conduit 47, the soil 17a and carbonated water 56 which has been separated from radioactive cesium in the separation vessel 10 are further separated into solid and liquid. The heavy soil 17 is allowed to sink to the lower part of the filter 47, the light carbonated water 56 which includes no soil 17a can be moved to the concentration tank 13.

The solid-liquid separation filter 49 in the embodiment includes a centrifuge containing a rotating tube therein (not shown). When solid-liquid components are sent from the separation vessel 10 to the concentration tank 13, the centrifuge is then activated to function separation. Then, the heavy soil 17a is moved to the outer side of the rotating tube, and the light carbonated water 56 which includes no soil 17a is move to the inner side of the rotating tube to perform solid-liquid separation. The separated soil 17a is allowed to sink to the lower part of the filter 49, and thereby allowing the separated carbonated water 56 to be sent to the concentration tank 13.

The soil activator 65 includes composts such as organic fertilizers, mycorrhizal fungi, or various kinds of chemical fertilizers such as nitrogen, phosphorus, and kalium. They are loaded on an appropriate position of the decontamination vehicle 9 to select appropriate ones depending on the situation of the area to be decontaminated. The selected ones are added to and mixed with the soil 17a after decontamination, and they are returned to original field from which the soil 17a is collected.

In the embodiments, powder fire extinguishant in a fire extinguisher of which the expiry date has passed and contains monobasic ammonium phosphate or ammonium sulfate is used as a soil activator 65. The powder fire extinguishant is subjected to a hydrophillic treatment to form fertilizer, and whereby the fire extinguishant can be used effectively.

The decontamination vehicle 9 includes the separation vessel 10, the water supply tank 12, the concentration tank 13, the gas cylinder 14, the suction pump 15, the solid-liquid separation filter 49, and the suction hose 11 which is provided on the top of the separation vessel 10 and can be wound on the separation vessel 10, and they are efficiently and compactly provided as described above. Thus, the decontamination vehicle 9 can be minimized in size and weight, and provided at a lower cost. Further, the decontamination vehicle 9 can be moved to terraced paddy fields in mountains and narrow farm roads in rural areas. The decontamination vehicle 9 can perform a series of decontamination work without requiring any heavy machinery for collecting the soil 17 with the mounted equipment by taking advantage of its mobility.

Next, when the contaminated soil is decontaminated with the decontamination vehicle 9, clean water 24 may not be able to be obtained on site. Thus, a predetermined amount of water 24 is stored in the water supply tank 12 in advance, and additionally, a predetermined amount of water 24 is stored in the separation vessel 10. The decontamination vehicle 9 is moved to the fields 3, the paddy field 5, mountains and forests, fallow farmlands, or lakes and marshes of the object area to be decontaminated 1, and parked on an adjacent farm road 8.

Thereafter, carbon dioxide filled in the gas cylinder 14 is sent to the water 24 in the separation vessel 10 via the gas conduit 38, and the agitator 58 is actuated to agitate the carbon dioxide and the water 24, thereby forming carbonated water 56 having a predetermined acid concentration by using the pH sensor 42. In the embodiments, the acid concentration of the carbonated water 56 is set to pH 3 to 6. This state is shown in FIG. 5.

In this case, carbon dioxide is pressurized to atmospheric pressure or more, and the pressurized carbon dioxide is dissolved into the water 24 to promote solubility, and thereby facilitating a rise in the acid concentration of the carbonated water 56.

As described above, in the embodiments, the weakly-acidic carbonated water 56 formed by the carbon dioxide and the water 24 is used as an eluting solvent for radioactive cesium. Accordingly, strong acid, such as oxalic acid, which is expensive and hazardous in handling, is not required, and decontamination work, which will be described later, can be performed safely.

After the carbonated water 56 is prepared in a manner as described above, the suction hose 11 is unreeled from the separation vessel 10. The worker 66 moves to a predetermined position for the decontamination work, holding the suction hose 11.

Before or after unreeling the suction hose 11, the suction pump 15 is actuated and the switching lever 57 is switched to the intake position. The air in the separation vessel 10 is sucked through the vent pipe 54 and the communication pipe 55, thereby enabling the suction hose 11 to suck from the end. Additionally, the agitator 58 is operated.

In such a situation described above, the end of the suction hose 11 is positioned immediately above the surface soil 2 of the contaminated field 3. In the case of the paddy fields 5 or wetlands, the end of the suction hose 11 is submerged in the water to suck the contaminated soil 17 and the contaminated water 4 immediately below. This state is shown in FIGS. 1 and 4(a)(II).

Accumulated contaminated water 4 and the contaminated soil 17 are sucked from the end of the suction hose 11, and moved to the separation vessel 10 through the suction hose 11. This state is shown in FIGS. 4(b) and 6.

In that case, the suction hose 11 may suck the dried and hardened soil 17, and the filter 19 may exclude a sucked lump of soil 17. Accordingly, the surface soil 2 preferably be dug up by using appropriate farming tools and prepared into fine pieces in advance before sucking of the soil 17.

Similarly, trees and plants 6, 7 on the surface soil 2 and trash are prevented from entering by the filter 19 because they prevent smooth introduction of the soil 17. Additionally, since radioactive cesium deposited on them increases burden on the separation capacity of the separation vessel 10, the trees and plants 6, 7 preferably be trimmed and removed.

The soil 17 and the water 4 suctioned in a manner as described are moved to the upper part of the separation vessel 10 guided by the suction hose 11. The soil 17 and water 4 come down and fall in the carbonated water 56 in the separation vessel 10 from the open end of the suction hose 11, and then they are mixed in the carbonated water 56 in the separation vessel 10. This state is shown in FIG. 6.

Thus, the radioactive cesium ions adhered to or deposited on the soil 17 or the water 4 are dissolved in the carbonated water 56, the radioactive cesium ions are mixed in the soil 17 and the water 4, and exist in the carbonated water 56 while maintaining a separated stated.

In this case, the acid concentration of the carbonated water 56 gradually decreases as the soil 17 and the water 4 are introduced. The changes are checked with pH sensor 42 and the acid concentration is maintained at a predetermined level by supplying carbon dioxide from the gas cylinder 14 as needed.

Thereafter, the sucking is once stopped after a predetermined amount of the contaminated soil 17 and the contaminated water 4 is sucked. They are stirred for a predetermined time in the separation vessel 10. When the radioactive cesium ions are sufficiently dissolved in the carbonated water 56, the on-off valve 18 is closed and the suction hose 11 is wound back around the reel 16, completing the suction operation of the contaminated soil 17 and the contaminated water 4.

Then, the on-off valve 48 is opened, and the switching lever 57 is switched from the intake position to the discharge position.

In this manner, air is taken from the vent pipe 54 and then sent to the communication pipe 55 through the loop conduits 51, 52. The air is discharged from the top of the separation vessel 10, and whereby the separation vessel 10 is pressurized.

Accordingly, the soil 17a and the water 4 are sent to the solid-liquid conduit 47 from the on-off valve 48 together with the radioactive cesium ions. These solid and liquid components are introduced into the solid-liquid separation filter 49.

In the solid-liquid separation filter 49, the centrifuge is activated before and after switching operation of the switching lever 57. The solid and liquid components are introduced into the rotating tube, heavy soil 17a is moved to the outer side within the rotating tube and light carbonated water 56 which does not include the soil 17a is moved to the inner side within the rotating tube, and whereby the soil 17a and carbonated water 56 are separated into solid and liquid.

Then, the radioactive cesium ions are dissolved into the carbonated water 56 and then separated. Further, the carbonated water 56 adhered to the soil 17a is separated from the soil 17a together with the radioactive cesium ions by the centrifugal effect.

Accordingly, the total amount of the radioactive cesium ions are sent to the concentration tank 13 together with the carbonated water 56, and the heavy soil 17a which includes no radioactive cesium ion is allowed to sink and accumulate on the lower part of the separation filter 49.

A basket 35 for receiving zeolite 36, which is an adsorbent, is provided at the lower periphery of the cathode 31 in the concentration tank 13, and the carbonated water 56 including the radioactive cesium ions is introduced in the concentration tank 13. This state is shown in FIG. 7.

After completing the carbonated water 56 including the radioactive cesium ions is introduced into the concentration tank 13 in the manner as described above, the agitator 59 is activated to stir the carbonated water 56, and activation of the suction pump 15 is stopped and the on-off valve 45 is closed.

Then, the acid concentration of the carbonated water 56 is checked by a pH sensor 43 to supply carbon dioxide into the concentration tank 13 and adjust the acid concentration of the carbonated water 56. Further, the heater 60 is heated to promote movement of the radioactive cesium ions.

Thereafter, the switch 34 is turned on to supply an electric current between the electrodes 30, 31, the radioactive cesium ions dissolved in the carbonated water 56 move toward the cathode 31 side, the radioactive cesium ions are adsorbed on the zeolite 36 provided around the cathode 31 and concentrated. This state is shown in FIG. 8.

Then, the electrodes 30 and 31 are energized for a predetermined time. When adsorption of the radioactive cesium ions by the zeolite 36 is completed, the switch 34 is turned off to stop the agitator 59 and the basket 35 is taken out from the concentration tank 13, and then the zeolite 36 on which the radioactive cesium ions are adsorbed is collected.

The discharge valve 50 immediately below the solid-liquid separation filter 49 is opened prior to or subsequent to the above operation to take the soil 17a, which has accumulated in the filter 49 and includes no radioactive cesium ion, to the outside. The soil 17a is moved to an appropriate place for drying.

As described above, the basket 35 is taken out from the concentration tank 13. After collecting the zeolite 36, the on-off valve 45 is opened and the switching lever 57 is switched to an intake position to restart actuation of the suction pump 15.

This operation sucks the air in the separation vessel 10 through the vent pipe 54 and the communication pipe 55, and thereby creating a negative pressure in the separation vessel 10. Then, the carbonated water 56 which is clean and includes no radioactive cesium ion in the concentration tank 13 is sucked to the solid-liquid conduit 47 and then transported to the separation vessel 10. During this operation, the centrifuge in the solid-liquid separation filter 49 is stopped to maintain the communication between the solid-liquid conduits 47, 47. This state is shown in FIG. 9.

After shifting the total amount of the carbonated water 56 in the concentration tank 13 into the separation vessel 10, the movement of the suction pump 15 is stopped and the on-off valves 45, 48 are closed, completing a series of the decontamination operation with the decontamination vehicle 9.

Zeolite 36 on which the radioactive cesium ions are adsorbed is sealed and stored in the container 63, and then stored in appropriate storage facilities 64 to prevent people from being subjected to radiation.

The collected soil 17a which includes no radioactive cesium ion is then dried. A specified soil activator 65 is added to the dried soil 17a to improve or modify the soil 17a.

The soil activator 65 to be used is selectable from organic fertilizers such as compost, mycorrhizal fungi, or various kinds of chemical fertilizers including nitrogen, phosphorus, and potassium. Such soil activator 65 is added to and mixed with the soil 17a, and the soil 17a is returned to the original field 3 where the soil has been collected.

This state is shown in FIGS. 4(f), 4(g) and FIGS. 10(a), 10(b).

In the embodiments, powder fire extinguishant in a fire extinguisher of which the expiry date has passed and contains monobasic ammonium phosphate or ammonium sulfate is used as a soil activator 65. The powder fire extinguishant is subjected to a hydrophillic treatment to form fertilizer, and whereby the fire extinguisher can be used effectively.

The soil 17a which has been improved or modified is returned to the field 3 from which the contaminated soil 17 is collected. Thus, the soil is recovered, and becomes more fertile than the original state, and therefore, farming can be restarted more promptly in this method compared with the case where the contaminated soil is simply decontaminated and returned to the original field 3.

As described above, in the embodiments, the decontamination vehicle 9 is driven to the object area to be decontaminated 1. The contaminated soil 17 and the contaminated water 4 in the object area 1 are collected and then decontaminated speedily with the facilities provided on the decontamination vehicle 9. The soil 17a which has been decontaminated is returned to the original field 3, completing a series of the decontamination operation in the object area 1. Thus, this kind of the decontamination work can be carried out efficiently and speedily, enabling farming to be restarted promptly.

The decontamination in the embodiments is not limited to the contaminated soil 17 and can be applied to decontamination of paddy fields 5 and wetlands where contaminated water 4 exists, whereby the decontamination method can be adopted for a wide variety of purposes and has practical effects.

As described above, the decontamination method and system for soil and the like of the invention decontaminate soil such as fields and water contaminated with radioactive materials reliably and rapidly on site, perform decontamination with precision, and enhance the efficiency of decontamination. The invention improves the decontaminated soil by adding a soil activator to the decontaminated soil, and then the improved soil is returned to the original field readily to promote the restart of farming. Further, the invention separates the radioactive materials adhering to or deposited on the soil from the soil precisely and then the radioactive materials are concentrated. The invention enables a reduction in the volume of the contaminated soil and achieves a safe treatment of the radioactive materials.

The invention claimed is:

1. A decontamination method for contaminated soil optionally together with contaminated water, comprising the steps of:
   moving a decontamination vehicle equipped with decontamination facilities to a decontamination site of contaminated soil;
   actuating suctioning by the decontamination vehicle thereby to suction and collect the contaminated soil and any contaminated water,
   introducing the collected contaminated soil and, any contaminated water into carbonated water provided in a separation vessel mounted on the decontamination vehicle to dissolve radioactive cesium;
   solid-liquid separating soil not containing the radioactive cesium from a mixture of the soil, any contaminated water, carbonated water and radioactive cesium to recover the soil;
   introducing the carbonated water containing the radioactive cesium after separating the soil into a concentration tank mounted on the decontamination vehicle to electrolyze the carbonated water; and
   recovering the radioactive cesium.

2. The decontamination method according to claim 1, wherein the decontamination vehicle has a carbon dioxide gas cylinder, a water supply tank and a solid-liquid separation filter mounted thereon in addition to the separation vessel and the concentration tank.

3. The decontamination method according to claim 1 or 2, wherein preparation of the carbonated water, separation of the radioactive cesium from the contaminated soil and any contaminated water, recovery of the soil not containing the radioactive cesium, recovery of the radioactive cesium by electrolysis of the carbonated water containing the radioactive cesium and return of the decontaminated soil to fields are carried out at the decontamination site.

4. The decontamination method according to claim 1, wherein the concentration tank has a cathode surrounded by a container containing an adsorbent to perform electrolysis.

5. The decontamination method according to claim 4, wherein the container is detachably mounted on the concentration tank.

6. The decontamination method according to claim 4, wherein the adsorbent has the radioactive cesium adsorbed thereon and is housed in a sealed container and the sealed container is stored in a storage facility.

7. The decontamination method according to claim 1, wherein electrolysis is performed in the concentration tank after completion of the steps of introducing the collected contaminated soil, and water, if any, into the separation vessel, preparing the carbonated water, introducing the mixture to the separation vessel, solid-liquid separating the mixture, introducing the carbonated water containing the radioactive cesium into the concentration tank after the solid-liquid separation.

8. The decontamination method according to claim 5, further comprising taking the container and adsorbent out of the concentration tank after the electrolysis and refluxing the carbonated water not containing radioactive cesium in the concentration tank to the separation vessel.

* * * * *